US012017440B2

(12) United States Patent
Andoh

(10) Patent No.: US 12,017,440 B2
(45) Date of Patent: Jun. 25, 2024

(54) METHOD FOR PRODUCING COMPOSITE OF CFRP WITH METAL MATERIAL AND COMPOSITE THEREOF

(71) Applicant: ANDOH-Corporation limited partnership company, Kanagawa (JP)

(72) Inventor: Naoki Andoh, Kanagawa (JP)

(73) Assignee: ANDOH-Corporation limited partnership company, Kanagawa (JP)

( * ) Notice: Subject to any disclaimer, the term of this patent is extended or adjusted under 35 U.S.C. 154(b) by 0 days.

(21) Appl. No.: 17/882,613

(22) Filed: Aug. 8, 2022

(65) Prior Publication Data

US 2023/0058394 A1 Feb. 23, 2023

(30) Foreign Application Priority Data

Aug. 10, 2021 (JP) ................................ 2021-130859

(51) Int. Cl.
*B32B 37/15* (2006.01)
*B29C 45/14* (2006.01)
(Continued)

(52) U.S. Cl.
CPC ........ *B32B 37/15* (2013.01); *B29C 45/14467* (2013.01); *B29C 45/14786* (2013.01);
(Continued)

(58) Field of Classification Search
CPC ........... B32B 37/15; B32B 5/024; B32B 7/12; B32B 15/08; B32B 15/14; B32B 15/20; B32B 27/12; B32B 27/281; B32B 27/288; B32B 37/06; B32B 37/1284; B32B 2255/06; B32B 2255/26; B32B 2260/021; B32B 2260/046; B32B 2262/106; B32B 2270/00; B32B 2305/188;
(Continued)

(56) References Cited

U.S. PATENT DOCUMENTS

2010/0098910 A1* 4/2010 Naritomi ................ B32B 5/024
216/33
2019/0322020 A1* 10/2019 Andoh ............. B29C 45/14795

FOREIGN PATENT DOCUMENTS

JP 2011073191 4/2011
JP 2016150547 8/2016
(Continued)

OTHER PUBLICATIONS

Machine translation of JP 2011-026457 A; Inventor: Narutomi Masanori; Publication: 10/ Feb. 2011.*

*Primary Examiner* — Vishal I Patel
(74) *Attorney, Agent, or Firm* — JCIPRNET

(57) ABSTRACT

A CFRP material with an Al alloy sheet attached to or a CFRTP material with an Al alloy sheet attached to is prepared by joining an Al alloy sheet with a CFRP material or a CFRTP material by adhesion or by injection molding. The surface of this Al alloy sheet and a surface of metal material such as Ti, etc., are subjected to chemical treatment. After this chemical treatment, the CFRP material with an Al alloy sheet attached to or the CFRTP material with an Al alloy sheet attached to and the metal material are inserted into a metallic mold for injection molding so as to have a gap therebetween. High crystalline thermoplastic resin is injected into this gap to join the metal material with the Al alloy sheet, thus obtaining a laminated composite.

7 Claims, 8 Drawing Sheets article joined by injection molding (for measuring shear joining strength)

(51) Int. Cl.

| | |
|---|---|
| ***B29C 65/00*** | (2006.01) |
| ***B29C 65/48*** | (2006.01) |
| ***B32B 5/02*** | (2006.01) |
| ***B32B 7/12*** | (2006.01) |
| ***B32B 15/08*** | (2006.01) |
| ***B32B 15/14*** | (2006.01) |
| ***B32B 15/20*** | (2006.01) |
| ***B32B 27/12*** | (2006.01) |
| ***B32B 27/28*** | (2006.01) |
| ***B32B 37/06*** | (2006.01) |
| ***B32B 37/12*** | (2006.01) |
| *B29K 101/12* | (2006.01) |
| *B29K 307/04* | (2006.01) |
| *B29K 705/02* | (2006.01) |

(52) U.S. Cl.
CPC ........... *B29C 65/48* (2013.01); *B29C 66/026* (2013.01); *B29C 66/7212* (2013.01); *B29C 66/7422* (2013.01); *B32B 5/024* (2013.01); *B32B 7/12* (2013.01); *B32B 15/08* (2013.01); *B32B 15/14* (2013.01); *B32B 15/20* (2013.01); *B32B 27/12* (2013.01); *B32B 27/281* (2013.01); *B32B 27/288* (2013.01); *B32B 37/06* (2013.01); *B32B 37/1284* (2013.01); *B29C 2045/14532* (2013.01); *B29K 2101/12* (2013.01); *B29K 2307/04* (2013.01); *B29K 2705/02* (2013.01); *B29K 2995/0041* (2013.01); *B32B 2255/06* (2013.01); *B32B 2255/26* (2013.01); *B32B 2260/021* (2013.01); *B32B 2260/046* (2013.01); *B32B 2262/106* (2013.01); *B32B 2270/00* (2013.01); *B32B 2305/188* (2013.01); *B32B 2307/732* (2013.01); *B32B 2311/18* (2013.01); *B32B 2311/24* (2013.01); *B32B 2311/30* (2013.01); *B32B 2313/04* (2013.01); *B32B 2371/00* (2013.01); *B32B 2377/00* (2013.01)

(58) Field of Classification Search
CPC ........... B32B 2307/732; B32B 2311/24; B32B 2311/30; B32B 2313/04; B32B 2371/00; B32B 2377/00; B29C 45/14467; B29C 45/14786; B29C 65/48; B29C 66/026; B29C 66/7212; B29C 66/7422; B29C 2045/14532; B29K 2101/12; B29K 2307/04; B29K 2705/02; B29K 2995/0041
See application file for complete search history.

(56) References Cited

FOREIGN PATENT DOCUMENTS

| | | |
|---|---|---|
| JP | 2020018513 | 2/2020 |
| JP | 2020176274 | 10/2020 |
| JP | 2021040744 | 3/2021 |
| JP | 2021095385 | 6/2021 |
| WO | 2008114669 | 9/2008 |
| WO | 2008126812 | 10/2008 |
| WO | 2008133030 | 11/2008 |
| WO | 2008133096 | 11/2008 |
| WO | 2008133296 | 11/2008 |
| WO | 2008146833 | 12/2008 |

* cited by examiner article joined by injection molding (for measuring shear joining strength)

article joined by injection molding (for measuring tensile joining strength)

joined article by adhesive of a metal piece with another metal piece
(for measuring shear adhesion strength)

joined article by adhesive of a CFRP piece with another CFRP piece
(for measuring shear adhesion strength)

joined article by adhesive (for measuring tensile adhesion strength)

METHOD FOR PRODUCING COMPOSITE OF CFRP WITH METAL MATERIAL AND COMPOSITE THEREOF

CROSS-REFERENCE TO RELATED APPLICATION

This application claims the priority benefit of Japan application serial no. 2021-130859, filed on Aug. 10, 2021. The entirety of the above-mentioned patent application is hereby incorporated by reference herein and made a part of this specification.

FIELD OF THE INVENTION

The present disclosure relates to a method for producing a composite of CFRP with a metal material and the composite thereof. More particularly, the present disclosure relates to a method for producing a composite of CFRP with a metal material as a composite that can be used as a structural material for an automobile, an aircraft, etc., and in which CFRP including CFRTP of light weight and high strength and metal materials of high strength are laminated to be integrated, and to the composite thereof.

BACKGROUND OF THE INVENTION

More than ten years have passed since CFRP (Carbon Fiber Reinforced Plastic) as an ultralight material with high strength has come to be used for a main structural material for a main wing, etc., of a largescale passenger airplane. It is necessary to fix the main wing at the end portion thereof to a body made of an ultra-super duralumin (Al alloy A7075). It is said that, when the CFRP is to be fixed to the body made of a metal material, aircraft producers could not avoid much labor in designing attaching structure and attaching method. While CFRP is provided with mechanical strength comparative with a high strength metal, it is essentially a plastic born by carbon fiber (referred to as "CF" below) and requires strong fastening with (securing to) a metal material for composing it in a body structure. For example, when fastened structure combined by a bolt-nut with a through-hole formed on a CFRP material is employed as such a fastened structure, CFRP will be broken when the nut is fastened too much. A producer of aircrafts, pursuing this fastened structure, developed a nut preventing over-fastening and employed it for aircrafts produced by the producer. Here, this does not mean necessarily that the developed fastening technique has come to accomplishment. From a report of it, it is possible to say only based on historical accumulation of efforts as to how long a time range this fastened structure keeps reliability of anti-fatigue property, etc.

CFRP material is ordinarily a fiber reinforced plastic material using CF with a thermosetting epoxy resin as a matrix resin, enabling adhesion with a metal member by use of an epoxy adhesive. Due to this, when it is necessary to secure CFRP to a metal member as mentioned above, it is ideal for a lighter weight not to employ mechanical fastening means such as a bolt-nut but to employ adhesion by adhesive. As a method by adhesion is sufficiently possible technically, study and development have been conducted by aircraft producers, etc. In such a situation, what was finally employed for manufacturing a large-scale passenger aircraft was a rivet joining method using rivets made of Ti alloy. As seen from the fact that a fastening method by a bolt-nut was employed and an adhesion method using adhesive was not employed, this is assumed to be based on a decision such that there are many unsolved problems in an adhesion method. As for mechanical assembling of metal materials with high strength each other, fastening (securing) method by rivet is fully accomplished as assembling method historically. Joining by such rivet fastening method has been used in manufacturing aircrafts as an old technique with its career over a half century and is known as a fastening method having a high reliability. However, if a joining assembly method using adhesive were made practical, this method will enable a lighter structure to be composed more easily, compared with a rivet joining method or a bolt-nut joining method. In particular, if fastening of a wing made of CFRP material with a main central structure in the body made of metal material with high strength using adhesive could be made practical in a certified manner, it will be possible to apply the technique not only for a large-scale passenger aircraft but also for other aircrafts as a small-scale airplane, a military plane, a high-speed drone, etc., and improvement of performance by ultra-light weight can be expected. Further, it is expected that the technique can be applied in wider fields of moving machines such as automobiles, etc., other than aircrafts.

Problems of Adhesion Method

At present, thread structure is used in most cases of assembly in a structure such as various machineries, buildings, etc. That is, assembly method using adhesive for adhesion between parts is a rare securing method., as seen from whole machine manufacturing industry. As a rare example, structures by adhesion are employed in assembly of a body of a passenger aircraft. At present, as for joining of a rib structure made of an Al-alloy A7075 (ultra-super duralumin) with a hull sheet member made of an Al-alloy A2024A (super duralumin), joining by adhesive is used as an ordinary structure of a body of a passenger aircraft. While, for assembling this part, rivets were used and then screws or resistance welding were used in the past, method by adhesion is steadily used at present as it provides most light weight and high reliability. To say adversely, there is almost no case of employing structure by adhesion for assembling an important part other than in aircraft manufacturing industry. Also, to take another view, securing method by adhesion is used only joining metal members of a same kind. That is, the example mentioned above is a joined article of ultra-super duralumin (Al alloy A7075) with super duralumin (Al alloy A2024), being a joined article of Al-alloys for each other in short. Why an article by adhesion of CFRP material with an Al-alloy A7075, etc., is not employed for a basic structure of an aircraft?

On the other hand, the present inventor developed and proposed a basic method for raising strength of adhesion between various metal materials or between various materials with CFRP materials named it. This named adhesion method is "NAT" (Nano Adhesion technology: see, for example Patent Documents 1 to 6) and performance of the adhesion method consists, to say in short, in enabling strength of adhesion by it to be multiplied by using an epoxy adhesive. However, even if strength of adhesion of a CFRP material with an Al alloy A7075 material by an adhesive were raised to a highest extent using this NAT, it could not be employed regrettably in basic structural parts of aircrafts, etc. It is so because there is a large difference in thermal linear expansion rate between the CFRP material and Al alloy A7075 material. Even if one component epoxy adhesive taken as one having a highest strength of adhesion as an adhesive is used or two component epoxy adhesive is used with which operation of adhesion and setting is possible nearly at an ordinary temperature, layers of adhesion in structures formed by adhesion with these adhesives will be easily broken when they are used in all of a wide temperature range, such as from −50° C. to +150° C. The reason for setting such a condition of temperature range (condition of experiment) is such that circumference under which an aircraft is operated includes one from a stratosphere to an airport in a tropical area and, while major parts of the body are exposed to a circumference in a temperature range from −50° C. to +80° C., parts near to engines or parts near to heat generating elements such as light emitting elements, etc., are exposed to a circumference in a temperature range from −50° C. to +150° C. Due to this, structures formed by adhesion cannot be employed, as an abnormal situation is brought to joined portions in such a temperature range of circumference.

Adhesion of a CFRP Material with Another CFRP Material

Then, as a preliminary test for the present disclosure, a CFRP piece is joined by adhesion with another CFRP piece of a same kind to prepare a pair of CFRP pieces joined by adhesion (a test piece) shown in FIG. 4(*b*), and shear strength of adhesion was measured holding it with a jig (see FIG. 3). Adhesion method for this was such that an end of each CFRP piece is treated with sand paper to be a coarse face and the two pieces are joined by adhesion of one component epoxy adhesive having a high strength of adhesion with the adhesive cured. Shear strength of adhesion of this pair joined by adhesion was about 40 MPa in average or 55 to 60 MPa at maximum. In any case of this test, beard-like thing of CF (carbon fiber) was left remaining in a trace of adhesion face of the pair formed by adhesion after breaking having exhibited the above highest level. From the result of this test, it is clear that breakdown of this test piece did not occur between the surface of CFRP piece and the surface of the cured adhesive but occurred between the surface of CF and the matrix resin of CFRP. In short, for a newest CF (with tensile breaking strength of about 6 GPa) having precisely circular fiber cross section and smooth fiber side surface, adhesion strength between the surface of CF and the thermosetting epoxy resin as a matrix resin is about 40 MPa. On the other hand, cross section of old type CF (with tensile breaking strength of about 3 GPa) is not precisely circular but of an ellipse form, rhombus form, a gourd form, etc. in strict, and there are longitudinal muscles or irregularities, etc., somewhere on side surface of CF. Also with the old type CF, strict adhesion strength between the surface of CF and the thermosetting epoxy resin as a matrix resin is about 40 MPa. In this, apparent adhesion strength by calculation taking the cross section of CF as precisely circular one exhibits about 55 to 60 MPa. In short, in a case such that direct adhesion of a metal material with surface having been subjected to the above NAT treatment and a CFRP material is conducted and thus formed test piece (CFRP on the resin side) as shown in FIG. 1 is subjected to a tensile test in a state without difference in coefficient of linear expansion, there is no case that the breakdown face is near to a surface on the metal side but breakdown occurs necessarily near to the site where CF is condensed on the CFRP material side (Patent Document 7).

As a consequence, it has no technical meaning to conduct improvement of NAT treatment method explained above corresponding to each metal material and raising adhesive strength in use of an epoxy adhesive to 60 MPa or higher, because adhesion strength between a CFRP material and a cured epoxy adhesive is about 40 MPa, or 55 to 60 MPa at highest. In particular, in use for an aircraft, in which CFRP with newest CF having a tensile breaking strength of about 6 GPa is used, there is not so much meaning to try for improving NAT treatment method as a chemical treatment of metal surface to raise adhesive strength with an epoxy adhesive to 40 MPa or higher.

(Joining Method with a High Strength Overcoming a Large Difference in Coefficients of Linear Thermal Expansion Between Materials)

On the basis of the above consideration, it can be said as follows.

(1) In order to make direct adhesion of a CFRP material with an Al alloy material A7075 securely, it is preferable to approximate coefficient of linear expansion of the CFRP material in a face of adhesion thereof to $2.3\times10^{-5}$ $K^{-1}$ (this is a value of coefficient of linear expansion of Al alloy); and (2) In order to make direct adhesion of a CFRP material with a metal material other than Al alloy securely, the metal material is preferable to be Ti alloy material, as one having lowest coefficient of linear expansion among practical metal materials is a Ti alloy material with coefficient of about $0.8\times10^{-5}$ $K^{-1}$. As a metal material exhibits a thermal reduction uniform in any direction in general, a CFRP material having CF of cloth type (woven fabric) on the face of adhesion or a CFRP material in which plurality of CFRP prepregs of unidirectional CF are laminated in rotated (crossing) manner is used to cause directionality of thermal reduction to be lowered, in order to approximate coefficient of linear expansion of the CFRP material to one of Ti alloy material. Coefficient in the face of this CFRP plate is about $0.2\times10^{-5}$ $K^{-1}$, thus providing adhesion with difference of coefficient of linear expansion of about $0.6\times10^{-5}$ $K^{-1}$.

For application to any material with the above conditions (1)+(2) as a prerequisite, in order to absorb the above difference of coefficient of linear expansion of about $0.6\times10^{-5}$ $K^{-1}$, (3) it is required to secure thickness of layer of cured adhesive of about 0.3 to 1.0 mm and to use adhesive having a high heat resistance (Patent Document 8). That is, the above (3) is to absorb thermal deformation of the material due to the difference of coefficient of linear expansion with elastic deformation of cured layer of the adhesive. After all, method for absorbing deformation due to difference of coefficient of linear expansion in adhesion of a CFRP material with a metal material to be joined thereto by adhesion results in a method of the above (1)+(3) and a method of the above (2)+(3). Even in such cases, when area of adhesion is wide, strictly to say, when a length of face of adhesion is over a limit rather than area of adhesion, there is a limit for the method of thickening the layer of cured adhesive. That is, with thermal shock (difference of temperature), delamination occurs at the longest portion (angular portions, etc., of face of adhesion) that exhibits expansion-reduction in a largest extent. This is a natural result as long as there is a distinct difference of coefficient of linear expansion between the CFRP material and metal material, as there is a limit of deformation for absorbing expansion-reduction due to difference of temperature even if cured adhesive sandwiched therebetween has elastic softness.

In short, in case of a CFRP material joined by adhesive with a metal material as in the disclosure (prior disclosure) disclosed in Patent Document 8 presented by the present inventor, allowable elastic deformation of cured adhesive is utilized with thickness of layer of cured adhesive sandwiched between the two materials being 0.3 mm or more, taking difference of coefficient of linear expansion in lateral-vertical directions in a face of adhesion into consideration. Here, elastic deformation of cured adhesive absorbs change in dimension (thermal reduction) forcibly brought to the layer of cured adhesive from the upper and lower faces (both faces). For a composite of a CFRP material joined by adhesion with a metal material, such a case is assumed that this cured adhesive has a square area of adhesion of 5 cm×5 cm and a thickness of 1 mm, for example, one side is a plate of Al alloy A7075 and the other side is a plate of CFRP obtained by laminating plurality of uni-directional CFRP prepregs to be cured. With this composite, coefficient of linear expansion on the side of Al alloy is $2.3\times10^{-5}$ $K^{-1}$ and coefficient of linear expansion in the face of plate of CFRP is about $0.1\times10^{-5}$ $K^{-1}$ in lengthwise direction and about (7 to 8)$\times10^{-5}$ $K^{-1}$ (coefficient of linear expansion of matrix resin as epoxy adhesive) in width direction. This coefficient of linear expansion is averaged to be near to a value of $3.5\times10^{-5}$ $K^{-1}$, apart from whether such average has physical meaning or not in adhesion. In short, a plate material of CFRP has large difference in coefficient of linear expansion according to direction of CF even if the plate has a flat face. Here, considering in view of difference of coefficient of linear expansion from Al alloy material, the difference becomes rather small if the averaged value of $3.5\times10^{-5}$ $K^{-1}$ is taken as a value on the CFRP plate side.

(Examples of Calculation Regarding How Layer of Cured Adhesive is Deformed with Coefficient of Linear Expansion)

FIG. 6(*a*) shows an example of adhesion of a composite in which a CFRP material is joined by adhesion with a metal material. FIG. 6(*b*) and FIG. 6(*c*) are schematic views showing calculated deformation in a cured state and in a cooled state of the layer of cured adhesive in the composite. In FIG. 6(*b*), such a case is assumed that, when adhesion has been conducted with one component epoxy adhesive heated and cured at a temperature of 150° C., thickness of the cured adhesive is 1.00 mm at a time of curing and the face of adhesion is of a square form with a side of 5.000 cm. This cured adhesive is of a thin cuboid form with a side of upper and lower square faces of 5.000 cm (50.00 mm) having a thickness of 1.00 mm. When temperature of this composite is lowered to −50° C., that is, lowering by 200° C., in the upper side face of the cured adhesive (the side of Al alloy piece in FIG. 6(*a*)), a side of the face becomes shorter by 5.000 cm×(2.3)$\times10^{-5}$ $K^{-1}$)×200° C.=0.023 cm (0.23 mm), so that the face becomes a square with each side of 4.9777 cm (49.977 mm). On the other hand, in the lower side face of the cured adhesive (the side of the plate of CFRP in FIG. 6(*a*)), a side of the face becomes shorter by 5.000 cm×(0.1×$10^{-5}$ $K^{-1}$)×200° C.=0.001 cm (0.01 mm), thus becoming 4.999 cm in the face in fiber direction of CF. In a direction vertical to the fiber direction of CF, a side of the face becomes shorter by 5.000 cm×(7$\times10^{-5}$ $K^{-1}$)×200° C.=0.023 cm (0.23 mm), thus becoming 4.977 m (FIG. 6(*c*)). In short, the form shown in FIG. 6(*b*) is a form of the cured adhesive under 150° C., and the form of the cured adhesive becomes one shown in FIG. 6(*c*) under −50° C. as lowered by 200° C. Under a temperature of −50° C., the side of Al alloy piece on the upper side is reduced uniformly as a metal material to be a square with each side of 4.977 cm. In contrast to this, while, with the face on the CFRP side on the lower side, the side in direction of CF does not change substantially from the initial length to be 4.999 cm, but the side in direction vertical to CF becomes 4.977 cm, so that the cured adhesive becomes of a form, in which only one side is much reduced to be 4.977 under a large influence of matrix resin.

In order to confirm whether consideration of this cured adhesive by modeling reflects actual behavior or not, 3000 cycle test of heating and cooling was tried for certification. For example, durability of the composite in which the plate of CFRP material and the plate of Al alloy A7075 material continue to be held by adhesion force is decided according to whether cured adhesive consisting of cured epoxy adhesive in this example can continue to exist without being broken. The cured adhesive as assumed in this example does not contain reinforcing fiber of a short fiber type such as GF (glass fiber) and has a strong chemical cross linking, so that it has somewhat hardness though having itself a soft elastic property. With thickness of the cured adhesive being about 1.00 mm, its form when it has been heated and cured at 150° C. as shown in FIG. 6(*b*) changes, when cooled to −50° C., to a form as shown in FIG. 6(*c*), in which the most elongated side is one on (diagonal) lines at each of four corners. This line at the corner, being 1.00 mm under +150° C., is elongated to 1.03 mm when cooled to −50° C. It is decided that, if change of length is in this extent, the cured adhesive is not broken even if change of form is forced from outside. Specifically, certifying experiment is required to confirm that no abnormalities occur subjecting the composite to a test of −50° C./+150° C. thermal shock for 3000 cycles.

Here, the present inventor already conducted such certifying experiment, certified the above matter with good results and filed a patent application (Patent Document 8). In short, this was presented as such that, for a pair joined by adhesion (composite), in which two materials having a large difference of coefficient of linear expansion each other are joined by adhesion using a technique of high strength adhesion such as NAT method presented by the present inventor, to be a pair joined by adhesion durable to thermal shock test of several thousand cycles, it is a required condition to make thickness of the layer of cured adhesive less than 1 mm (structure joined by adhesion having a thickness of 0.3 to 1.0 mm is proposed in Patent Document 8).

(Utilization of a Technique of Joining by Injection Molding in Prior Disclosure)

Here, gist of the method for producing a composite according to the present disclosure does not consist in a cured adhesive by adhesion according to the above prior disclosure (Patent Document 8), nor in a joining technique by adhesive. That is, the present disclosure produces a composite of CFRTP (carbon fiber reinforced thermoplastic resin) with a metal material, as another disclosure of the present inventor, et al., through joining by injection molding preferable for productivity and mass production, thus providing improvement of laminated structure of the composite. In other words, the method for producing a composite of the present disclosure utilizes disclosures relating to a joining technique by injection molding, etc., disclosed in Patent Document 9, and further two others (Patent Documents 10, 11 (prior disclosures)). The technology of joining by injection molding presented and named by the present inventor et. al. includes "NMT (nano molding technology)" and "SNMT (special nano molding technology)", and the present disclosure utilizes these. The present disclosure presents an integrated composite of one of various practical metal material with a CFRP (in narrow sense) or CFRTP, and a method for producing the same, the composite being one, for example, formed by joining both materials by injection molding using "CM3506G50" (made by Toray Co. Ltd.: main company in Tokyo, Japan) as a polyamide resin. With this, such an integrated article can be obtained that has a high joining strength between the metal material and the resin material having been subjected to injection molding as of shear joining strength of about 50 to 65 MPa. In short, a pair joined by adhesion other than one joined with a one component epoxy adhesive could not get a shear strength of adhesion in a level of 60 MPa, and could not get a shear strength of adhesion in a level of 30 MPa at a temperature of 150° C. However, it was found that a joining strength between a metal material and a resin material for injection molding, that is, a shear joining strength between a metal-resin materials in a similar level can be obtained, using a polyamide resin or a PEEK resin for injection molding. Consequently, employing SNMT as a best joining technique by injection molding and employing a method of using injected resin in place of adhesive, that is, a joining technique by injection molding for joining two materials in which the two materials are inserted into a metallic mold for injection molding and a resin is injected into a gap of a several mm provided between the two materials, a joining structure similar to the above cured adhesive can be obtained. It is a start point of the present disclosure to have noticed this.

[Joining Strength of a Composite of a CFRP Material or a CFRTP Material with a Metal Material]

For strong joining of two materials of a CFRP material or a CFRTP material with a metal using the above presented technology of joining by injection molding, disclosures disclosed in Patent Document 10 or 11 cannot be used unless both materials are of metal materials. That is, it is impossible to obtain a composite as a joined article by injection molding having a shear joining strength of 50 to 65 MPa, using a CFRP material, the above polyamide resin "CM3506G50", PEEK resin, etc., as a resin for joining by injection molding. In a case where a CFRP material as a non-metal material is to be joined directly with a metal material, a method joining of two materials by injection molding cannot be applied. It can be said that these materials are not joined at all experimentally. Further, it is similar also for a material called as a kind of CFRP material in which various thermoplastic resins are used as a matrix resin (commonly named as a CFRTP material), so that it is difficult to obtain desired joining strength through a method for joining two materials by injection molding in which a CFRTP material is joined directly with a metal material. Due to this, a CFRP material with a sheet of Al alloy attached to is prepared preliminarily at first, through operation of adhesion of a CFRP material and a sheet of high strength Al alloy by "NAT" as a joining technology with adhesive using a heat resistant one component epoxy adhesive. Explaining briefly this technique, coefficients of linear expansion of these materials are $0.2\times10^{-5}$ $K^{-1}$ for CFRP and $2.3\times10^{-5}$ $K^{-1}$ for Al alloy, respectively, giving a difference of $2.1\times10^{-5}$ $K^{-1}$ between these. As a complete joining condition of one component epoxy adhesive is 150 to 170° C., so, when this pair (composite) joined by adhesion, supposing that both of these materials were of plates, are cooled spontaneously to a room temperature, high inner stress towards breaking will be generated in the layer of cured adhesive. Thus, although the pair joined by adhesion (composite) cooled spontaneously to a room temperature seems as if there occurred no change, crack occurs in the layer of cured adhesive only by the spontaneous cooling, if the pair joined by adhesion has a form as shown in FIGS. 4(*a*) and 4(*b*) and shear strength of adhesion when the pair has been subjected to tensile breaking is drastically weak for a pair such as of about 10 to 20 MPa.

However, as a technically interesting matter, in a case where a CFRP material is a plate having a thickness of 3 to 10 mm and the other material is an Al alloy A6061 having a thickness of 0.5 mm, shear strength of adhesion of about 38 to 40 MPa or about 55 to 58 MPa can be obtained for a joined article by adhesion mentioned above. When the CFRP, referred to here, is a CFRP material using a high strength CF having a tensile strength near to 6 GPa, shear strength of adhesion becomes about 38 to 40 MPa over the above value, and when the CFRP material is one using a CF having a tensile strength in a 3 GPa level, shear strength of adhesion becomes 55 to 58 MPa. That is, as strength of adhesion is decided according to what a tensile strength the used CF has, it is an unavoidable matter. However, it can be said that, if used adhesive has a high strength of adhesion, expansion-reduction of a metal sheet follows change (thermal reduction) on the side of the plate, and that, due to this, so much influence is not brought to strength of adhesion between a metal material in a CFRP material with a metal sheet attached thereto and the CFRP material, even if there is a large difference between the coefficients of linear expansion of these materials. On the other hand, the present inventor et. al. propose basically an integrated composite of CFRP with a metal material using a PAEK resin such as a polyamide resin "CM3506G50" (made by Torey Co. Ltd.: main company in Tokyo, Japan), PEEK, etc., which is heat-resistant and does not generate poisonous gas, even if involved in a fire accident in relation to not only Al alloy but also all kinds of high strength metals.

With chemical treatment disclosed here, shear joining strength between the metal and resin in a composite joined by injection molding becomes 50 to 64 MPa, which has not so much difference from the highest shear joining strength of adhesion between the metals of 60 MPa by a joining technology by adhesion "NAT". Also, the present inventor et al. propose a laminated composite with adhesive consisting of three layers of FRP materials and a structural metal material at both ends and an intermediate aluminum alloy so as to endure added thermal shock even if there is a difference in coefficients of linear expansion between members (Patent Documents 1, 2).

PRIOR ART DOCUMENTS

Patent Documents

[Patent Document 1] WO2008/114669

[Patent Document 2] WO2008/133096

[Patent Document 3] WO2008/133296

[Patent Document 4] WO2008/126812

[Patent Document 5] WO2008/133030

[Patent Document 6] WO2008/146833

[Patent Document 7] JP, Published Patent Application No. 2011-073191

[Patent Document 8] JP, Published Patent Application No. 2021-040744

[Patent Document 9] JP, Published Patent Application No. 2016-150547

[Patent Document 10] JP, Patent Application No. 2020-176274

[Patent Document 11] JP, Patent Application No. 2021-095385

[Patent Document 12] JP, Patent Application No. 2020-018513

SUMMERY OF THE INVENTION

Problems to be Solved by the Invention

It can be said from the background above that as adhesive is mainly used for joining in composites of a FRP material such as CFRP with non-aluminum metal alloy, aluminum alloy, etc., which are proposed variously, productivity thereof is low. For production of a composite of a CFRP material with a metal material, a joining method and a joined structure are desired such that productivity is excellent as well as high strength of joining can be attained.

The present disclosure provides a method for producing a composite of a CFRP with a metal material with which productivity is raised by conducting joining of the CFRP with the metal material having a high strength by injection molding, and also a composite produced by the method.

The present disclosure further provides a method for producing a CFRP with a metal material using a thermoplastic resin having high versatility and harmless when burned, etc., to join a CFRP with a metal material as a result, and also a composite produced by the method.

The present disclosure further provides a method for producing a CFRP with a metal material using a thermoplastic resin having high versatility as well as high thermal shock resistance, and also a composite produced by the method.

The present disclosure further provides a method for producing a CFRP with a metal material with which a CFRP or CFRTP can be joined securely with any of various generic metals, and also a composite produced by the method.

Means for Solving the Problems

A method for producing a composite of CFRP with a metal material according to the present disclosure 1 is one that comprises:

- a step of chemical treatment of an Al alloy sheet by causing one surface of an Al alloy sheet having a thickness of 0.3 to 0.8 mm to be subjected to chemical treatment for adhesion,
- a step of adhesion by joining the one surface of the Al alloy sheet to a surface of a CFRP material by adhesion to obtain a CFRP material with an Al alloy sheet attached to,
- a step of chemical treatment for joining by injection molding by causing a surface of a metal material and the other surface of the Al alloy sheet to be subjected to chemical treatment for joining by injection molding,
- a step of inserting by inserting the metal material and the CFRP material with an Al alloy sheet attached to into a metallic mold for injection molding so that the surface of the metal material and the other surface of the Al alloy sheet have a gap of 1.0 to 5.0 mm therebetween,
- a step of injection by injecting a high crystalline thermoplastic resin having heat resistance for joining by injection molding into the gap to form the composite of CFRP with a metal material.

A method for producing a composite of CFRP with a metal material according to the present disclosure 2 is one that comprises:

- a step of joining a resin plate with an Al alloy sheet attached to in which crystalline thermoplastic resin is injected onto one surface of an Al alloy sheet having a thickness of 0.3 to 0.8 mm to be joined,
- a step of preparing a CFRTP plate having a main content resin of the crystalline thermoplastic resin as a matrix resin,
- a step of heat press lamination by inserting the CFRTP plate and the resin plate with an Al alloy sheet attached to into a metallic mold for heat press so that one surface of the CFRTP plate and a resin side surface of the resin plate with an Al alloy sheet attached to are laid to overlap each other and conducting fused lamination to obtain a CFRTP plate with an Al alloy sheet attached to,
- a step of chemical treatment for joining by injection molding by causing a surface of a metal plate material and the other surface of the Al alloy sheet to be subjected to chemical treatment for joining by injection molding,
- a step of inserting by inserting the CFRP material with an Al alloy sheet attached to and the metal plate material into a metallic mold for injection molding so that the surface of the CFRTP material with an Al alloy sheet attached to on the Al alloy sheet side and a surface of the metal plate material have a gap of 1.0 to 5.0 mm therebetween,
- a step of injection by injecting a high crystalline thermoplastic resin having heat resistance for joining by injection molding into the gap to form the composite of CFRP with a metal material.

A method for producing a composite of CFRP with a metal material according to the present disclosure 3 is one that, in the present disclosure 1, the step of adhesion includes, as a preliminary treatment:

- a step of chemical treatment for adhesion by conducting chemical treatment for joining by adhesive on one surface of the Al alloy sheet,
- a step of painting the one surface with one component epoxy adhesive,
- a step of laminating the Al alloy sheet by overlaying the one surface of the Al alloy sheet on laminated materials of laminated CFRP prepregs, and
- a step of adhesive setting by heating the laminated materials, in which the CFRP prepregs and the Al alloy sheet are laminated, in a circumstance decompressed below atmospheric pressure; and the step of chemical treatment for joining by injection molding of the other surface of the Al alloy sheet and the surface of the metal material includes conducting surface treatment so as to provide the surfaces with surface configuration, chemical reaction properties or surface physical properties suitable for joining by injection molding.

A method for producing a composite of CFRP with a metal material according to the present disclosure 4 is one that, in the present disclosure 2, the high crystalline thermoplastic resin and the matrix resin contained in the CFRTP plate are of a same kind of thermoplastic resin composition and have resin possible to be mixed completely in time of melting as a main resin content.

A method for producing a composite of CFRP with a metal material according to the present disclosure 5 is one that, in any of the present disclosure 1 to 4, the Al alloy sheet material is of an Al alloy selected from A5052, A5083 and A6061 defined in Japan Industrial Standard.

A method for producing a composite of CFRP with a metal material according to the present disclosure 6 is one that, in any of the present disclosure 1 to 4, the metal material is one selected from Al alloys A2014, A2017, A2024 and A7075 defined in Japan Industrial Standard or one selected from common steel, stainless steel and 64 Ti alloy.

A method for producing a composite of CFRP with a metal material according to the present disclosure 7 is one that, in any of the present disclosure 1 to 4, the high crystalline thermoplastic resin is one selected from PPS resin, polyamide resin and PAEK resin including PEEK.

A method for producing a composite of CFRP with a metal material according to the present disclosure 8 is one that, in the present disclosure 7, the PPS resin is one such that does not contain GF or contains GF by no more than 20 w %, the polyamide resin is one such that does not contain GF or contains GF by no more than 33.3 w %, and the PEEK or PAEK resin is one such that does not contain GF or a mixed resin with mass ratio of the PEEK to polyetherimide (PEI) resin of 95:5 to 85:15.

A method for producing a composite of CFRP with a metal material according to the present disclosure 9 is one that, in any of the present disclosure 1 to 8, the chemical treatment of the Al alloy sheet and the metal material is one such that water soluble amine compound is treated with triethanolamine or EDTA (4 Na).

A composite of CFRP with a metal material is one that is produced by a method for producing a composite of CFRP with a metal material according to the present disclosure 1 to 9.

Each element composing a composite and a method for producing the same according to the present disclosure will be explained in summery below.

[Species of CFRP: CFRP or CFRTP]

CFRP composing a composite in the present disclosure, that is, both of CFRP in a narrow sense and CFRTP, is carbon fiber reinforced plastics, as a solid of long fiber reinforced plastics obtained by reinforcing bundles or cloths of carbon fiber (CF) with resin. CFRP in the present disclosure is one in which thermosetting resin such as epoxy resin, etc., is used as a matrix (base material) resin in a narrow sense, and CFRTP (Carbon Fiber Reinforced Thermoplastics) is one in which thermoplastic resin such as polyamide, etc., is used as a matrix resin. CFRP in the present disclosure in a broad sense includes CFRTP and CFRP in a narrow sense. CFRP in the present disclosure is not special one, but may be one having versatility such as one available commercially. CF disposed in matrix resin may be one aligned in a direction, one in which layers of uni-directional CF are laminated to cross alternately, one in a state of woven fabric, etc., and these are to be selected according to a position where the composite of the present disclosure is used. While matrix resin of CFRP or CFRTP is preferable to be versatile thermosetting resin, it may be anyone.

[Al Alloy Sheet]

An Al alloy sheet composing a composite of the present disclosure is joined onto a surface of the above CFRP or CFRTP, and this joining is conducted by adhesion or by injection molding. The Al alloy sheet has thickness of 0.3 to 0.8 mm and its surface is subjected to surface treatment to have a determined surface roughness for adhesion or joining in a beforehand step of the adhesion or joining. As the Al alloy sheet of the present disclosure is thin, it follows thermal expansion-reduction of the CFRP or CFRTP and transfers stress, with which the Al alloy sheet is loaded, to the CFRP or CFRTP. The Al alloy sheet follows also difference of expansion-reduction in directions perpendicular to each other in a face of adhesion of the CFRP or CFRTP with the Al alloy sheet. Aluminum alloy for extension defined in Japan Industrial Standard is most preferable for the Al alloy sheet material. Specifically, one such as selected from A5052, A5083, A6061 of Al—Mg—Si alloy is named for this.

[Metal Material]

A metal material composing a composite of the present disclosure is one to be integrated with CFRP or CFRTP, being joined with the CFRP or CFRTP via the above Al alloy sheet and high crystalline thermoplastic resin. The metal material may be anyone used for bodies, casings, etc., of various machines. Specifically, regarding Al alloys, aluminum alloy for extension is favorable, such as one selected from A2014. A2017, A2024 as Al—Cu—Mg alloy and A7075 as Al—Zn—Mg alloy defined in Japan Industrial Standard. Otherwise, various common steels, stainless steels, 64 Ti alloys, etc., are used. As the metal material is joined with the high crystalline thermoplastic resin to compose a composite, the surface of the metal material joined with the high crystalline thermoplastic resin is preliminarily subjected to chemical treatment before joining in order to raise strength of joining.

[High Crystalline Thermoplastic Resin]

High crystalline thermoplastic resin composing a composite of the present disclosure is a member, being a thin layer, for joining the above Al alloy sheet with the metal material. Joining of the Al alloy sheet with the metal material is conducted through insert molding. That is, a CFRP material or a CFRTP material with an Al alloy sheet joined thereto and a metal material are inserted into a metallic mold for injection molding and high crystalline thermoplastic resin is injected into the gap between the two materials to form a composite. Consequently, the high crystalline thermoplastic resin is a joining material of the Al alloy sheet with the metal material, also an adhesive thereof and also a laminating material thereof. As the high crystalline thermoplastic resin, it is preferable to use one selected from PPS resin, polyamide resin and PAEK resin including PEEK. In a case of PPS resin, one that does not contain glass fiber (GF) or one containing GF by 20 wt % or less is preferable. In a case of polyamide resin, one that does not contain GF or one containing GF by 33.3 wt % or less is preferable. In a case of polyetheretherketone (PEEK) resin, one that does not contain GF can be used, and resin mixture with mass ratio of polyetheretherketone to polyetherimide (PEI) being 95:5 to 85:15 provides higher strength of adhesion than a resin using PEEK alone.

[Adhesion of CFRP Material with Al Alloy Sheet]

In production of a composite of the present disclosure, an Al alloy sheet is joined to a CFRP material or CFRTP material preliminarily. While joining of the CFRP material with the Al alloy sheet is conducted through adhesion, it is necessary to make a surface for adhesion of the Al alloy sheet optimum state through chemical treatment before adhesion. As this chemical treatment is not a gist of the present disclosure but of a known art, detailed explanation is omitted here. The chemical treatment is conducted, for example, by a method disclosed in Patent Document 1 presented by the present inventor et al. a method in Experiment Example 8 explained later, etc. The surface of the Al alloy sheet having been subjected to such chemical treatment for adhesion is coated with heat resistant one component epoxy adhesive. This Al alloy sheet coated with heat resistant one component epoxy adhesive is laid onto a laminated plate with CFRP prepregs laminated. The laminated one of the CFRP prepregs with the Al alloy sheet is heated under a circumstance decompressed below atmospheric pressure to be cured. Through a series of these operations of adhesion, a CFRP with Al alloy sheet attached to is prepared.

[Joining of CFRTP with Al Alloy Sheet]

Joining of a CFRTP material with an Al alloy sheet is conducted in two steps (see FIGS. 9 and 10. In a first step, a resin plate with an Al alloy sheet attached to is prepared. Before this preparation, matrix resin of the CFRTP material is joined onto one face of Al alloy sheet by injection molding. While a surface of the Al alloy sheet is subjected to chemical treatment before this joining, this chemical treatment is conducted, for example, by a method disclosed in Patent Document 10, etc., presented by the present inventor et al., though not limited to this, a method explained in Experiment Example 2 ("SNMT": abbreviation of Special Nano molding technology), etc. In a second step, a CFRTP material is joined onto the resin plate with Al alloy sheet attached to through heating and compressing. A resin portion of the resin plate with an Al alloy sheet attached to and the CFRTP material are laminated, heated over the softening temperature of the resin material preferably under vacuum state and pressed to join the matrix resin of the CFRTP material and the resin portion of the resin plate with an Al alloy sheet attached to through thermal fusion.

[Joining of Metal Material with Al Alloy Sheet]

As explained above, high crystalline thermoplastic resin composing a composite of the present disclosure is a member for joining the Al alloy sheet with the metal material each other. Joining of the Al alloy sheet with the metal material is conducted by injecting the high crystalline thermoplastic resin to join them each other. Optimum chemical treatment of surfaces of the metal material and the Al alloy sheet is necessary for joining by the high crystalline thermoplastic resin with higher strength. For this, while known techniques presented and disclosed by the present inventor et al. may be used, SNMT treatments explained later are most favorable (Experiment Examples 2, 3, 4, 5, 6 and 7 explained later).

Advantageous Effect

A composite of CFRP with a metal material of the present disclosure is one in which a CFRP material or a CFRTP material and one of various high strength metal materials including Al alloys such as duralumin, steel materials, Ti alloy, SUS, etc., are integrated with high strength, even if there is a large difference in coefficients of linear expansion between the composing elements, and can endure thermal shock. As the composite of the present disclosure can be used for bodies with light weight and high strength of various machines such as aircrafts, it can be dedicated to resource conservation or energy conservation. As joining by injection molding is a main technique of the method for producing a composite of the present disclosure, it provides a producing method with high productivity, implemented easily in automated manner for mass production.

BRIEF DESCRIPTION OF DRAWINGS

FIG. 9 is a schematic view of steps showing steps in which an Al alloy sheet is inserted into a metallic mold for injection molding and high crystalline thermoplastic resin for joining by injection molding is injected thereinto to obtain a resin plate with an Al alloy sheet attached to.

DETAILED DESCRIPTION OF PREFERRED EMBODIMENTS

[Method for Producing a Composite of a CFRP with an Al Alloy Sheet Attached to with a Metal Material]

Figure 8:
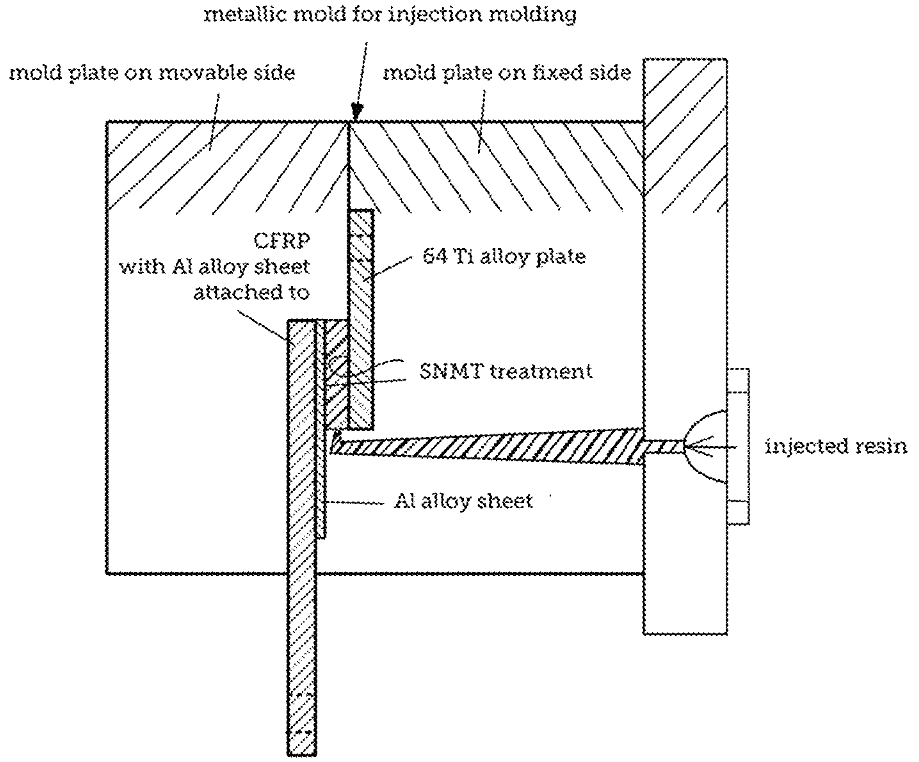
FIG. 8 is a schematic view showing an example of disposition in which both of a CFRP plate with an Al alloy sheet attached to having been subjected to surface treatment and a high strength metal plate having been subjected to surface treatment are inserted into a metallic mold for injection molding.

Embodiments of a method for producing a composite of a CFRP with a metal material and a composite thereof will be explained below. Here, a composite is exemplified in which a CFRP plate with an Al alloy sheet attached to is joined with 64 Ti alloy plate piece as a high strength metal plate piece. FIG. 8 is a schematic view showing, in section, a metallic mold for injection molding for producing a composite. This metallic mold for injection molding is one, into which both of a CFRP plate material with an Al alloy sheet attached to and a 64 Ti alloy plate material are inserted to integrate them. For the CFRP plate material with an Al alloy sheet attached to, a surface of the Al alloy sheet has been subjected to chemical treatment ("SNMT treatment" in Experiment Example 2 explained later), and a surface of the 64 Ti alloy plate material as a high strength metal material has been subjected to chemical treatment ("SNMT treatment" in Experiment Example 3 or 4 explained later) similarly. In preparing the CFRP plate material with an Al alloy sheet attached to, after one face of the Al alloy sheet has been subjected to chemical treatment ("NAT treatment" in Experiment Example 8 explained later) so as to make joining strength optimum, this face of the Al alloy sheet having been subjected to chemical treatment is joined to one face of the CFRP plate material by adhesion (adhesion treatment in Experiment Example 9). In view point of raising joining strength, it is preferable that adhesive for this is one component epoxy adhesive, being of a similar kind as a main component of matrix resin of the CFRP. With this adhesive as well as method of adhesion in details will be explained later.

Further, mechanical working, etc., so as to be of a desired form have been conducted on the 64 Ti alloy plate material according to object for use, one face of the plate material has been subjected to chemical treatment so as to make it optimum for joining by injection molding (in Experiment example 3 or 4 explained later). Similarly, also a surface of the Al alloy sheet on the side where resin of the CFRP plate material is joined has been subjected to chemical treatment (Experiment Example 2). As shown in FIG. 8, the CFRP plate material with an Al alloy sheet attached to and the 64 Ti alloy plate material are inserted into a metallic mold for injection molding with a determined gap therebetween. Then, thermoplastic resin composition of PPS resin, polyamide resin, PAEK resin including PEEK, etc., is injected into the gap to produce a composite in which a CFRP and a metal material are integrated securely. While the composite of CFRP with a metal material in this embodiment is one using a CFRP with a thermosetting resin as a matrix resin, CFRP may be one with a thermoplastic synthetic resin as a matrix resin, in place of the above CFRP. A composite, in which a resin plate with an Al alloy sheet attached to is joined with CFRTP using such CFRTP will be explained.

[Method for Producing a Composite of CFRTP with an Al Alloy Sheet Attached to with a Metal Material]

Figure 9:
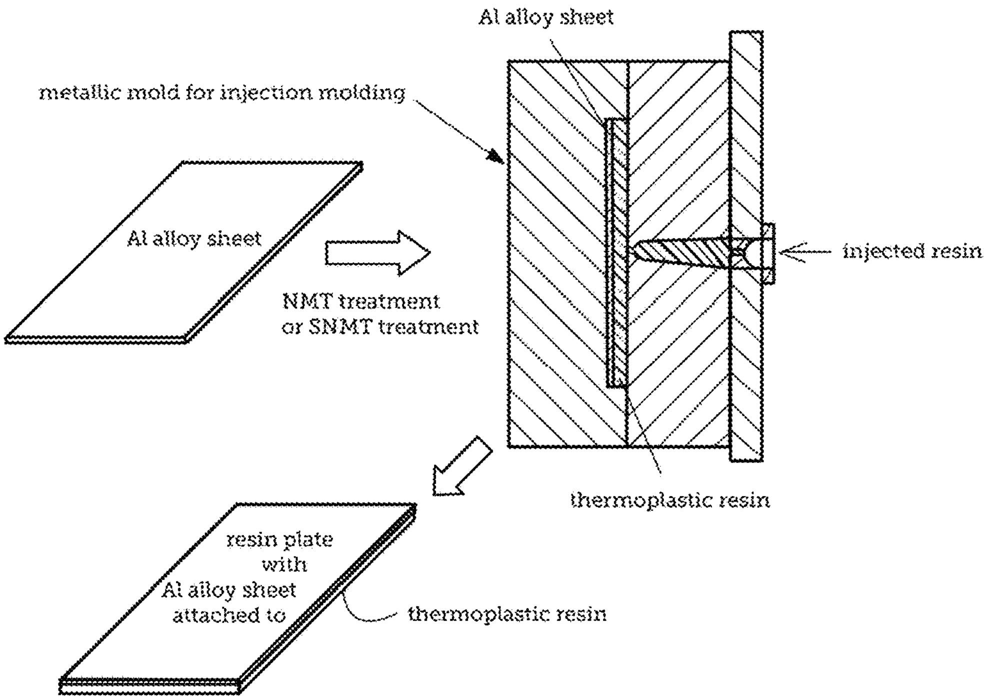
Figure 10:
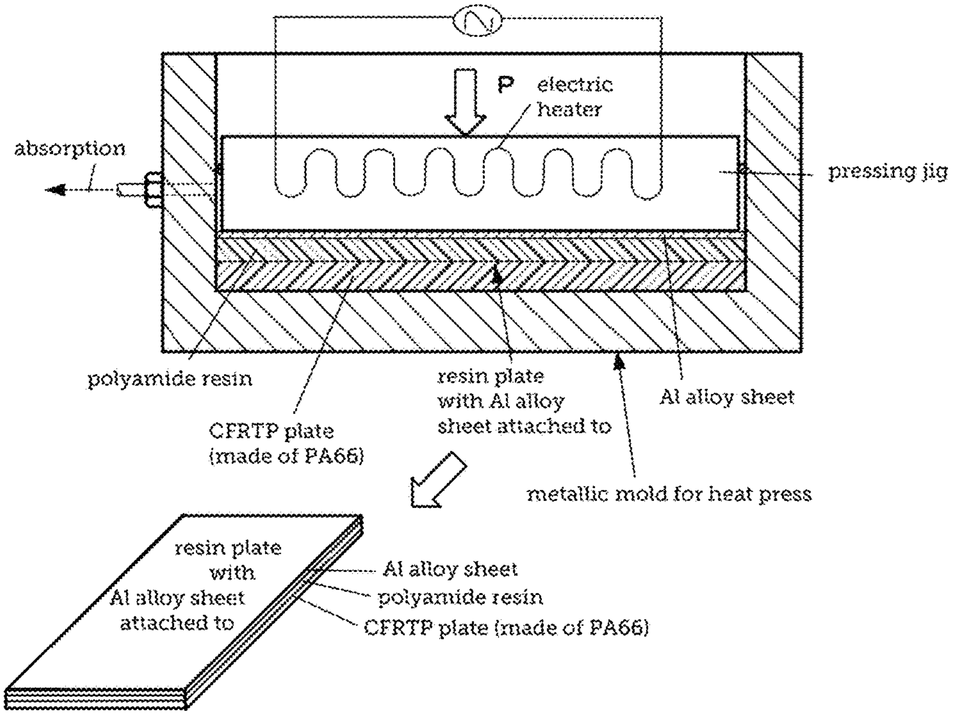
FIG. 10 is a schematic view showing thermal fusion of a resin plate with an Al alloy sheet attached to with a CFRTP material using a thermal press machine.

For producing a composite of CFRTP with an Al alloy sheet attached to with a metal material, it is necessary to prepare a resin plate with an Al alloy sheet attached to preliminarily. FIGS. 9 and 10 are schematic views showing a method for producing a resin plate with an Al alloy sheet attached to. Chemical treatment is conducted on one face of the Al alloy sheet in order to cause resin to be joined thereto (for example, in Experiment Example 1 or 2). As shown in FIG. 9, the Al alloy sheet with the face thereof having been subjected to chemical treatment is inserted into a metallic mold for injection molding, and then thermoplastic resin, such as PEEK resin, is injected onto the surface having been subjected to chemical treatment to form a thin layer on a surface of the Al alloy sheet. With this step of joining by injection molding, a thermoplastic resin plate with an Al alloy sheet attached to is formed. Further, when a composite of a CFRTP plate integrally joined onto the thermoplastic resin plate is produced, a metallic mold for vacuum heat press is used. FIG. 10 is a sectional view showing a concept of the metallic mold for vacuum heat press. In producing a composite, a CFRTP plate having matrix resin, for example of PEEK resin, is inserted into the metallic mold for vacuum heat press, and then a thermoplastic resin plate with an Al alloy sheet attached to is laminated thereon with the resin side downwards. A heat pressing jig is placed thereon to conduct heating and pressing with an electric heater. At the same time of the heating and pressing, air within the metallic mold for vacuum heat press is absorbed as well as air on the face of thermal fusion as a face of joining is absorbed to strengthen joining. The heating is conducted at a temperature near softening point of the PEEK resin. A CFRTP plate with an Al alloy sheet attached to is prepared through heating and pressing in such a manner as shown in FIG. 10. In producing a composite of a CFRTP plate with a metal material, the CFRTP plate with an Al alloy sheet attached to and the metal material are joined by a high crystalline thermoplastic resin in a metallic mold for injection joining (not shown) in a similar manner as shown in FIG. 8. Through these steps, a composite of CFRTP with an Al alloy sheet attached to with a metal material is produced.

Examples of Structure of a Composite of the Present Disclosure

Figure 11:
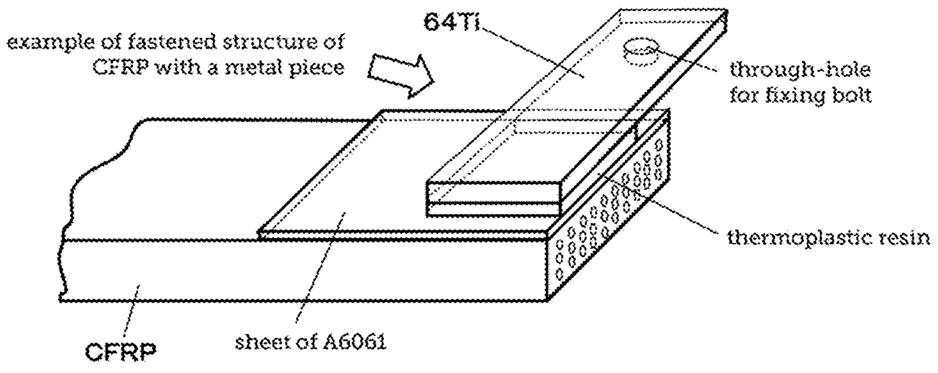
FIG. 11 is a structural view showing an example of form of a composite of a resin plate with an Al alloy sheet attached to with a high strength metal material.
Figure 12:
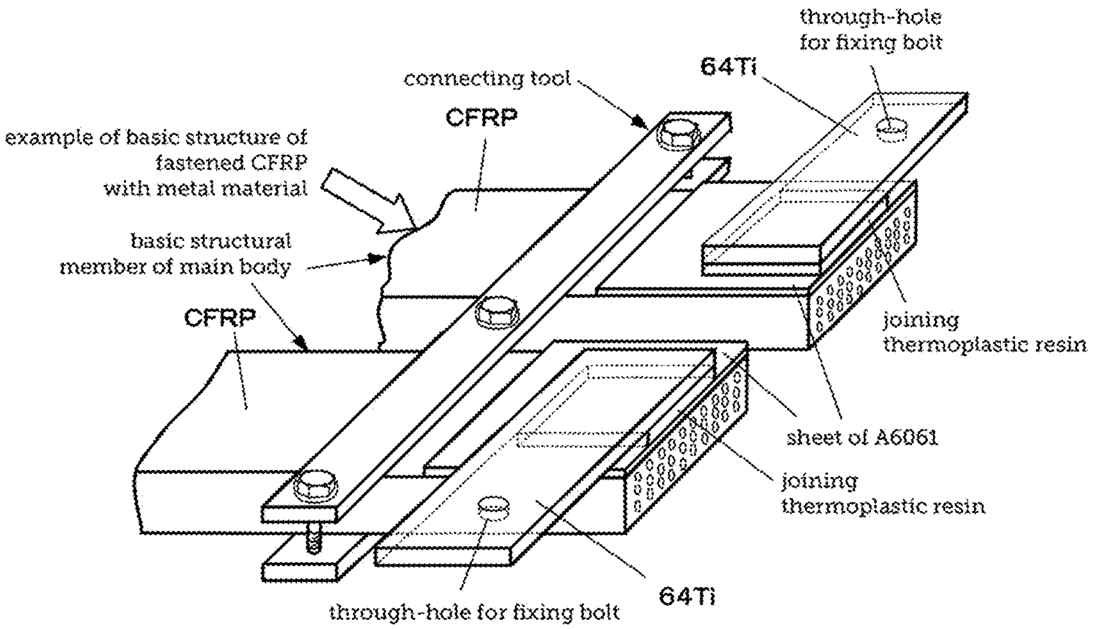
FIG. 12 is a structural view showing an example in which composites shown in FIG. 11 are connected as a backbone structure of a structural body.

FIG. 11 shows an example of joining structure in a composite of CFRP with a metal material obtained by the producing method as explained referring to FIG. 8. This composite has a 64 Ti alloy plate joined thereto for conducting mechanical fastening with a structure made of CFRP, the 64 Ti alloy plate having a through-hole formed therein to conduct fastening with a bolt-nut. FIG. 12 is a schematic view showing an example of structure in which this composite is used as a large-scale structure. This example is one, in which, as CFRP has characteristics of being long, flexible and strong, the composites are used as a basic structure corresponding to a backbone of a body of an aircraft utilizing the characteristics of CFRP. Plurality of elongated CFRP plates is disposed to and fixed with mechanical connecting tools to form a backbone structure. In this example, ends of the backbone structure provide a mechanical fastening structure such as by bolt-nut as shown in FIG. 11. As can be seen from these examples of structure, it is possible to compose an integrated article with a composite of CFRP with a metal material of the present disclosure, utilizing characteristics of mechanical strength of each element material, as well as being strong even if there is a difference in coefficients of thermal expansion therebetween. Here, also CFRTP can be used as a structural material similarly, though not shown.

EMBODIMENTS

Embodiments of the present disclosure will be explained in detail below.

(a) Measurement of Joining Strength by Injection Molding

Figure 1:
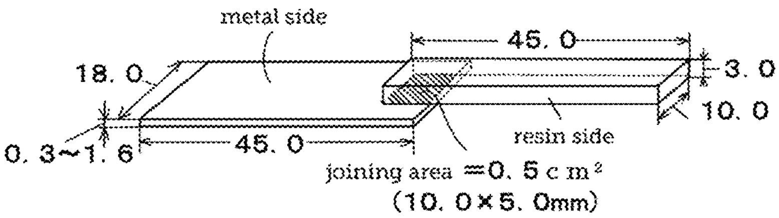
FIG. 1 is a view showing a joined article by injection molding for measuring shear strength of joining as a test piece.
Figure 2:
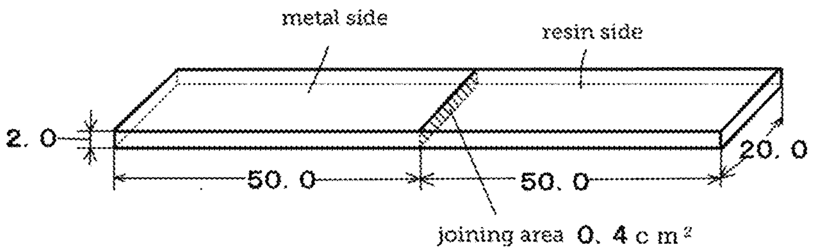
FIG. 2 is a view sowing a joined article by injection molding for measuring tensile strength of joining as a test piece.
Figure 3:
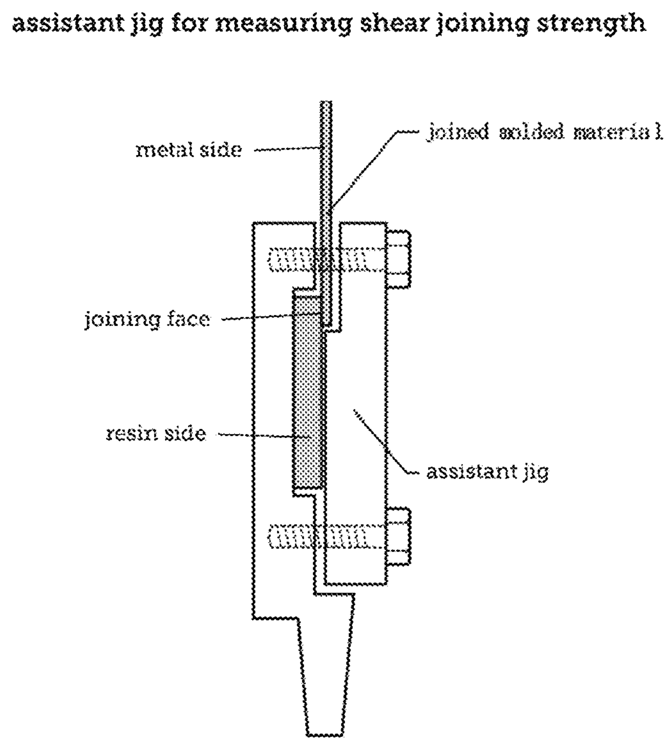
FIG. 3 is a view showing an assistant jig for fixing a test piece when shear strength of joining is measured.

Shear joining strength referred to in the present disclosure is a value of shear breaking at a time when a test piece shown in FIG. 1 is subjected to tensile breaking with a test machine. This shear joining strength is a shear strength at time when a metal is joined with a resin (joined by injection molding). For a tensile test machine, "AG-500N/1 kN" (manufactured by Shimadzu-seisakusho Co. Ltd.: main company in Kyoto, Japan) was used, and measurement was conducted at a tension speed of 10 mm/min. FIG. 3 shows an assistant jig used in the measurement. Measurement method with these is one according to ISO19095. Similarly, a test piece shown in FIG. 2 is one for measuring tensile joining strength between the metal and resin in a joined article by injection molding. This measurement method is one according to ISO19095.

(b) Measurement of Joining Strength by Adhesion

Figure 4A:
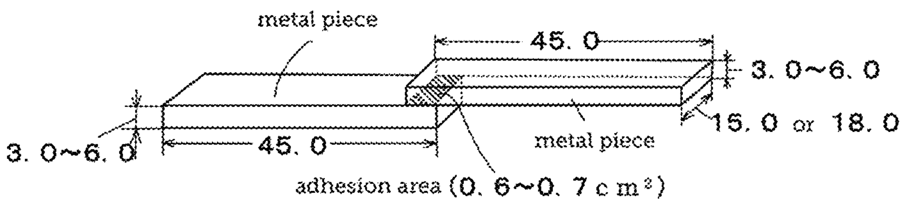
FIGS. 4(*a*) and 4(*b*) are views showing a test piece for measuring shear strength of adhesion, in which FIG. 4(*a*) shows a test piece for measuring shear strength of adhesion of metal pieces with each other, and FIG. 4(*b*) shows a test piece for measuring shear strength of adhesion of CFRP pieces with each other.
Figure 4B:
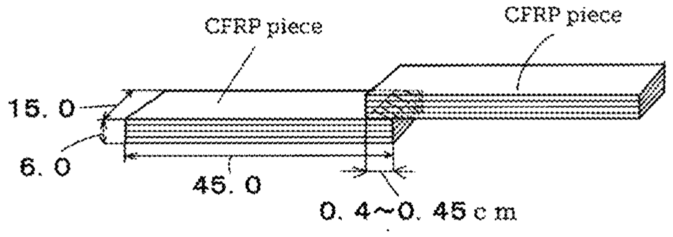
Figure 5:
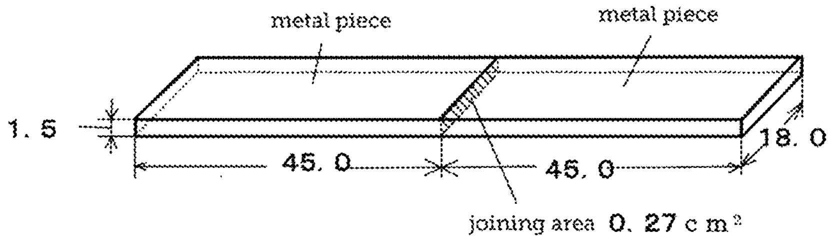
FIG. 5 is a view showing a test piece composed of joined metal pieces with each other for showing tensile strength between the metal pieces.
Figure 6A:
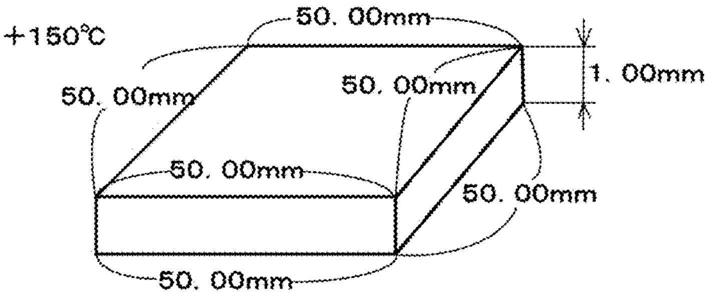
FIG. 6(*a*) is a view showing an example of adhesion of a composite in which CFRP is joined with a metal material by adhesion, FIG. 6(*b*) is a schematic view showing cured adhesive of a composite heated to be cured at a temperature of 150° C., and FIG. 6(*c*) is a schematic view showing cured adhesive cooled to a temperature of −50° C.
Figure 6B:
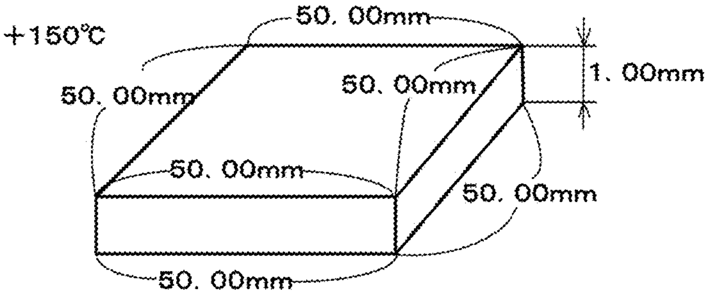
Figure 6C:
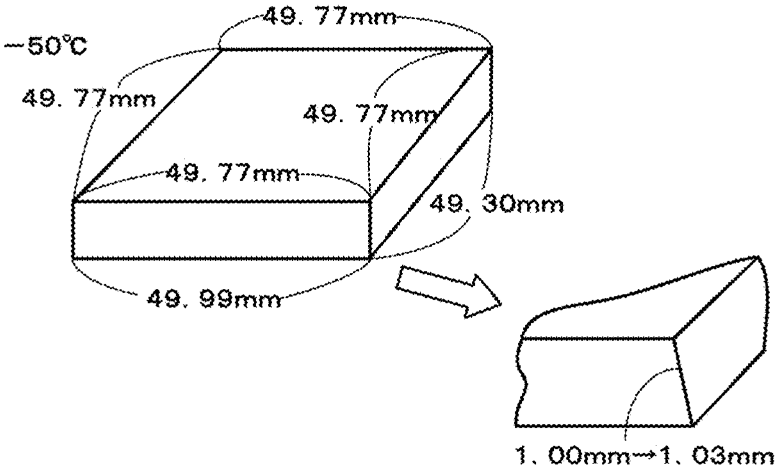
Figure 7:
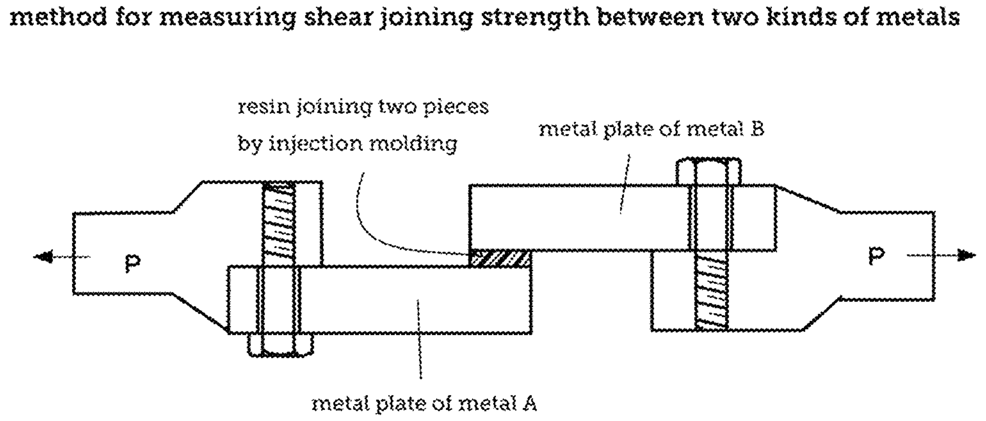
FIG. 7 is a view showing a test method in which shear strength of adhesion is measured for a test piece joined by adhesion through thermal fusion by injecting resin for joining by injection molding between two metal plates.

The test piece shown in FIG. 4(*a*) is an adhesion test piece for measuring adhesion strength between the metal pieces used in the present disclosure, being one for measuring shear adhesion strength between metal materials. As shown in FIG. 4(*b*), when these metal pieces are replaced with CFRP pieces, shear adhesion strength can be measured. Similarly, the test piece shown in FIG. 5 is a test piece for measuring tensile joining strength between metal pieces. This measurement method is one according to ISO19095. A test machine for these is one explained above and measurement was conducted at a tension speed of 10 mm/min similarly.

(c) [Thermal Shock Cycle Test]

Thermal shock cycle test was conducted for the above test pieces. A small type cooling-heating thermal shock test instrument "TSE-12-A" manufactured by Espec Co. Ltd. (main company in Osaka, Japan) was used for thermal shock cycle test. Condition of the thermal shock cycle test conducted in a standard manner was such that temperature of cooling room is −50° C., temperature of high temperature room is 150° C., staying time in each room is 25 minutes and time for transfer is 5 minutes. The test instrument itself is placed in a room where temperature is constantly adjusted to 27° C. and automatic operation was conducted by raising the temperature of the cooling room periodically to the room temperature to melt frozen portion in the instrument in a natural manner. However, in order to prevent such an accident of frozen instrument that may occur even with the automatic operation cycle in a high humidity time, test was conducted by keeping a safe operation by ceasing operation of the test instrument in weekend days, new year days, successive holidays in May, August, etc.

Surface treatment of each test piece, method for preparing thereof, etc., will be explained as Experiment Examples below.

[EXPERIMENT EXAMPLES] SURFACE TREATMENT OF EACH MATERIAL

[Experiment Example 1] Surface Treatment of Al Alloy A7075 (Referred to as "SNMT Treatment" in the Present Disclosure)

Plates of Al alloy A7075 with thickness 1.5 mm were purchased and subjected to mechanical working to obtain Al alloy pieces having necessary form. An aqueous solution containing degreaser for aluminum "NA-6" (made by Meltex Co. Ltd.: main company in Tokyo, Japan) by 10% was made ready to be at 60° C. in a tank for immersion, in which the above aluminum alloy pieces were immersed for 5 minutes, and after then the pieces were rinsed with tap water (Ota city, Gumma prefecture, Japan). Next, an aqueous solution of caustic soda having a concentration of 10.0% was made ready to be at 40° C. in still another tank, in which the Al alloy pieces were immersed for 1 minute, and after then the Al alloy pieces were rinsed with water. Next, an aqueous solution containing aluminum chloride hydrate having a concentration of 1.0% and hydrochloric acid having a concentration of 5.0% was made ready to be at 40° C. in another tank, in which the Al alloy pieces were immersed for 2 minutes, and after then the Al alloy pieces were rinsed with water. Next, an aqueous solution containing acid ammonium fluoride having a concentration of 2.0% and sulfuric acid having a concentration of 10.0% was made ready to be 40° C. in another tank, in which the Al alloy pieces were immersed for 1 minute, and after then the Al alloy pieces were rinsed with water. Next, an aqueous solution of caustic soda having a concentration of 1.5% was made ready to be at 40° C. in still another tank, in which the Al alloy pieces were immersed for 2 minutes, and after then the Al alloy pieces were rinsed with water. Next, an aqueous solution of nitric acid having a concentration of 3.0% was made ready to be at 40° C. in still another tank, in which the Al alloy pieces were immersed for 1 minute, and after then the pieces were rinsed with water. Next, an aqueous solution of hydrazine hydrate having a concentration of 3.5% was made ready to be at 60° C. in another tank, in which the Al alloy pieces were immersed for 1 minute, and then the alloy pieces were immersed in an aqueous solution of hydrazine hydrate having a concentration of 0.5% at 33° C. made ready in still another tank for 2.5 minutes, and after then the pieces were rinsed with water. Next, after the Al alloy pieces were immersed in hydrogen peroxide water having a concentration of 1.5% made ready in another tank for 1 minute, the Al alloy pieces were rinsed well with water. Next, the Al alloy pieces were immersed in an aqueous solution of triethanolamine having a concentration of 0.2% to be 40° C. made ready in another tank for 20 minutes, and then rinsed with aqueous solution of triethanolamine having a concentration of 50 ppm. These alloy pieces were placed in a warm air drier set to be at a temperature of 67° C. for 15 minutes to be dried there. After this, the Al alloy pieces were wrapped together with clean aluminum foil to be stored.

[Experiment Example 2] Surface Treatment of Al Alloy A6061 (SNMT Treatment)

Plates of Al alloy A6061 with thickness 1.5 mm were purchased and subjected to mechanical working to obtain Al alloy pieces having necessary form. An aqueous solution containing the above degreaser for aluminum "NA-6" by 10% was filled to be at 60° C. in a tank for immersion, in which the above aluminum alloy pieces were immersed for 5 minutes, and after then the Al alloy pieces were rinsed with tap water. Next, an aqueous solution of caustic soda having a concentration of 10.0% was made ready to be at 40° C. in another tank, in which the Al alloy pieces were immersed for 1 minute, and after then the pieces were rinsed with water. Next, an aqueous solution containing aluminum chloride hydrate having a concentration of 1.0% and hydrochloric acid having a concentration of 5.0% was made ready to be at 40° C. in another tank, in which the Al alloy pieces were immersed for 1 minute, and after then the Al alloy pieces were rinsed with water. Next, an aqueous solution containing acid ammonium fluoride having a concentration of 2.0% and sulfuric acid having a concentration of 10% was made ready to be 40° C. in another tank, in which the Al alloy pieces were immersed for 1 minute, and after then the alloy pieces were rinsed with water. Next, an aqueous solution of caustic soda having a concentration of 1.5% was made ready to be at 40° C. in another tank, in which the Al alloy pieces were immersed for 2 minutes, and after then the Al alloy pieces were rinsed with water. Next, an aqueous solution of nitric acid having a concentration of 3.0% was made ready to be at 40° C. in still another tank, in which the Al alloy pieces were immersed for 1.5 minutes, and after then the Al alloy pieces were rinsed with water. Next, an aqueous solution of hydrazine hydrate having a concentration of 3.5% was made ready to be at 60° C. in still another tank, in which the Al alloy pieces were immersed for 1 minute, and then the pieces were immersed in an aqueous solution of hydrazine hydrate having a concentration of 0.5% at 33° C. made ready in still another tank for 4.5 minute, and after then the Al alloy pieces were rinsed with water. Next, after the pieces were immersed in hydrogen peroxide water having a concentration of 1.5% for 1 minute, the Al alloy pieces were rinsed well with water. Next, the Al alloy pieces were immersed in an aqueous solution of triethanolamine having a concentration of 0.2% to be 40° C. made ready in another tank for 20 minutes, and then rinsed with aqueous solution of triethanolamine having a concentration of 50 ppm. These alloy pieces were placed in a warm air drier set to be at a temperature of 67° C. for 15 minutes to be dried there. After this, the Al alloy pieces were wrapped together with clean aluminum foil to be stored.

[Experiment Example 3] Surface Treatment of 64 Ti Alloy (SNMT Treatment)

Many plate pieces of 64 Ti alloy having a form of 45 mm×18 mm×thickness of 1.5 mm were acquired to be test pieces. An aqueous solution containing the above degreaser for aluminum "NA-6" by 10% was made ready to be at 60° C. in a tank for immersion, in which the above Ti alloy pieces were immersed for 5 minutes, and after then the pieces were rinsed with tap water. Next, an aqueous solution of acid ammonium fluoride having a concentration of 5% was made ready to be at 65° C. in another tank, in which the 64 Ti alloy pieces were immersed for 5 minutes, and after then the pieces were rinsed with water. Next, an aqueous solution of nitric acid having a concentration of 3.0% was made ready to be at 40° C. in another tank, in which the 64 Ti alloy pieces were immersed for 3 minutes, and after then the 64 Ti alloy pieces were rinsed with water. Next, an aqueous solution containing potassium permanganate having a concentration of 2.0% and caustic potassium having a concentration of 3.0% was made ready to be 70° C. in another tank, in which the Ti alloy pieces were immersed for 30 minutes, and after then the pieces were rinsed with water. Next, an aqueous solution containing sodium chlorite having a concentration of 5.0% and caustic soda having a concentration of 10.0% was made ready to be 55° C. in another tank, in which the 64 Ti alloy pieces were immersed for 10 minutes, and after this the 64 Ti alloy pieces were immersed in a tank provided with an ultrasonic oscillation end and filled with water for 7 minutes, cleaning them away from deposits. Next, the 64 Ti alloy pieces were immersed in an aqueous solution of triethanolamine having a concentration of 0.2% made ready to be 40° C. in another tank for 30 minutes, and after then the 64 Ti alloy pieces were rinsed well with an aqueous solution of triethanolamine having a concentration of 50 ppm made ready in another tank. After this, these 64 Ti alloy pieces were placed in a warm air drier set to be at a temperature of 67° C. for 15 minutes and dried there, after which the pieces were wrapped together with clean aluminum foil to be stored.

[Experiment Example 4] Surface Treatment of 64 Ti Alloy (Referred to as "SNMT 2 Treatment" in the Present Disclosure)

Many plate pieces of 64 Ti alloy having a form 45 mm×18 mm×thickness of 1.5 mm were acquired to be test pieces. An aqueous solution containing the above degreaser for aluminum "NA-6" by 10% was made ready to be at 60° C. in a tank for immersion, in which the above Ti alloy pieces were immersed for 5 minutes, and after then the pieces were rinsed with tap water. Next, an aqueous solution of acid ammonium fluoride having a concentration of 5.0% was made ready to be at 65° C. in another tank, in which the 64 Ti alloy pieces were immersed for 5 minutes, and after then the pieces were rinsed with water. Next, an aqueous solution of nitric acid having a concentration of 3.0% was made ready to be at 40° C. in another tank, in which the 64 Ti alloy pieces were immersed for 3 minutes, and after then the 64 Ti alloy pieces were rinsed with water. Next, an aqueous solution containing potassium permanganate having a concentration of 2.0% and caustic potassium having a concentration of 3.0% was made ready to be 70° C. in another tank, in which the Ti alloy pieces were immersed for 30 minutes, and after then the pieces were rinsed with water. Next, an aqueous solution containing sodium chlorite having a concentration of 5.0% and caustic soda having a concentration of 10.0% was made ready to be 55° C. in another tank, in which the 64 Ti alloy pieces were immersed for 10 minutes, and after this the 64 Ti alloy pieces were immersed in a tank provided with an ultrasonic oscillation end and filled with water for 7 minutes, cleaning them away from deposits. Next, the Ti alloy pieces were immersed in an aqueous solution of EDTA (4 Na) having a concentration of 0.4% made ready in another tank to be 40° C. for 10 minutes, and after then rinsed with an aqueous solution of acetic acid having a concentration of 0.1% made ready in another tank. After this, these 64 Ti alloy pieces were placed in a warm air drier set to be at a temperature of 67° C. for 15 minutes and dried there, after which the pieces were wrapped together with clean aluminum foil to be stored.

[Experiment Example 5] Surface Treatment of Steel SUS304 (SNMT Treatment)

Many plate pieces of steel SUS304 having a form of 45 mm×18 mm×thickness of 1.5 mm were acquired to be test pieces. An aqueous solution containing the above degreaser for aluminum "NA-6" by 10.0% was made ready to be at 60° C. in a tank for immersion, in which the above steel pieces were immersed for 5 minutes, and after then the pieces were rinsed with tap water. Next, an aqueous solution containing acid ammonium fluoride having a concentration of 1.0% and sulfuric acid having a concentration of 10.0% was made ready to be at 60° C. in another tank, in which the steel pieces were immersed for 6 minutes, and after then the steel pieces were rinsed with water. Next, the steel pieces were immersed in a tank provided with an ultrasonic oscillation end and filled with water for 7 minutes, cleaning them off from deposits. Next, an aqueous solution containing acid ammonium fluoride having a concentration of 0.5% and sulfuric acid having a concentration of 5% was made ready to be at 60° C. in another tank was made ready in another tank, in which the steel pieces were immersed for 20 minutes, and after then the steel pieces were rinsed with water. Next, an aqueous solution of nitric acid having a concentration of 3.0% was made ready to be at 40° C. in another tank, in which the steel pieces were immersed for 3 minutes, and after then the steel pieces were rinsed with water. Next, an aqueous solution containing sodium chlorite having a concentration of 5.0% and caustic soda having a concentration of 10% was made ready to be 55° C. in another tank, in which the steel pieces were immersed for 6 minutes, and after then the pieces were rinsed with water. Next, after the steel pieces were immersed in hydrogen peroxide water having a concentration of 1.5% for 0.5 minute, the steel pieces were rinsed well with water. Next, the steel pieces were immersed in an aqueous solution of triethanolamine having a concentration of 0.4% to be 40° C. made ready in another tank for 30 minutes, and then rinsed with aqueous solution of triethanolamine having a concentration of 50 ppm. Then, these steel pieces were placed in a warm air drier set to be at a temperature of 67° C. for 15 minutes to be dried there. After this, the Al alloy pieces were wrapped together with clean aluminum foil to be stored.

[Experiment Example 6] Surface Treatment of Steel SUS430 (SNMT Treatment)

Many plate pieces of steel SUS430 having a form of 45 mm×18 mm×thickness of 1.5 mm were acquired to be test pieces. An aqueous solution containing the above degreaser for aluminum "NA-6" by 10.0% was made ready to be at 60° C. in a tank for immersion, in which the above steel pieces were immersed for 5 minutes, and after then the pieces were rinsed with tap water. Next, an aqueous solution of acid ammonium fluoride having a concentration of 5.0% was made ready to be at 65° C. in another tank, in which the steel pieces were immersed for 10 minutes, and after then the steel pieces were rinsed with water. Next, the steel pieces were immersed in a tank provided with an ultrasonic oscillation end and filled with water for 7 minutes, cleaning them off from deposits. Next, an aqueous solution containing acid ammonium fluoride having a concentration of 0.5% and sulfuric acid having a concentration of 5% was made ready to be at 50° C. in another tank, in which the steel pieces were immersed for 5 minutes, and after then the steel pieces were rinsed with water. Next, an aqueous solution of nitric acid having a concentration of 3.0% was made ready to be at 40° C. in another tank, in which the steel pieces were immersed for 3 minutes, and after then the steel pieces were rinsed with water. Next, the steel pieces were immersed in a tank provided with an ultrasonic oscillation end and filled with water for 7 minutes, cleaning them off from deposits. Next, an aqueous solution containing potassium permanganate having a concentration of 2.0%, acetic acid having a concentration of 1.0% and acetic soda having a concentration of 0.5% was made ready to be 45° C. in another tank, in which the steel alloy pieces were immersed for 2 minutes, and after then the pieces were rinsed with water. Next, an aqueous solution containing potassium permanganate having a concentration of 2.0% and caustic potassium having a concentration of 3.0% was made ready to be 70° C. in another tank, in which the steel alloy pieces were immersed for 15 minutes, and after then the pieces were rinsed with water. Next, the steel pieces were immersed in a tank provided with an ultrasonic oscillation end and filled with water for 7 minutes, cleaning them off from deposits. Next, after the steel pieces were immersed in hydrogen peroxide water having a concentration of 1.5% for 0.5 minute, the steel pieces were rinsed well with water. Next, the steel pieces were immersed in an aqueous solution of triethanolamine having a concentration of 0.4% to be 40° C. made ready in another tank for 20 minutes, and then rinsed with aqueous solution of triethanolamine having a concentration of 50 ppm. Then, these steel pieces were placed in a warm air drier set to be at a temperature of 67° C. for 15 minutes to be dried there. After this, the Al alloy pieces were wrapped together with clean aluminum foil to be stored.

[Experiment Example 7] Surface Treatment of SPCC (SNMT Treatment)

SPCC plate pieces having a dimension of 45 mm×18 mm were cut out from a SPCC plate (Cold rolled steel plate) having a thickness of 1.6 mm through mechanical working to be test pieces. An aqueous solution containing the above degreaser for aluminum "NA-6" by 10.0% was made ready to be at 60° C. in a tank for immersion, in which the above steel pieces were immersed for 5 minutes, and after then the pieces were rinsed with tap water. Next, an aqueous solution of acid ammonium fluoride having a concentration of 5.0% was made ready to be at 65° C. in another tank, in which the steel pieces were immersed for 25 minutes, and after then the steel pieces were rinsed with water. Next, the steel pieces were immersed in aqueous solution of ammonium having a concentration of 1.0% made ready in another tank, and after then rinsed with water. Next, an aqueous solution containing potassium permanganate having a concentration of 2.0%, acetic acid having a concentration of 1.0% and acetic soda hydrate having a concentration of 0.5% was made ready to be 45° C. in another tank, in which the steel alloy pieces were immersed for 45 minutes, and after then the pieces were rinsed with water. Next, an aqueous solution containing potassium permanganate having a concentration of 2.0% and caustic soda having a concentration of 3.0% was made ready to be 70° C. in another tank, in which the steel alloy pieces were immersed for 20 minutes, and after then the pieces were rinsed with water. Next, the steel pieces were immersed in a tank provided with an ultrasonic oscillation end and filled with water for 7 minutes, cleaning them off from deposits. Next, after the steel pieces were immersed in hydrogen peroxide water having a concentration of 1.5% for 0.5 minute, the steel pieces were rinsed well with water. Next, the steel pieces were immersed in an aqueous solution of triethanolamine having a concentration of 0.2% to be 40° C. made ready in another tank for 30 minutes, and after then rinsed with dilute aqueous solution of triethanolamine having a concentration of 50 ppm. Then, these SPCC pieces were placed in a warm air drier set to be at a temperature of 67° C. for 15 minutes to be dried there. After this, these pieces were wrapped together with clean aluminum foil to be stored.

[Experiment Example 8] Surface Treatment of Al Alloy A6061 (Referred to as "NAT Treatment" in the Present Disclosure)

NAT treatment is a surface treatment method for adhesion. Plates of Al alloy A6061 with a thickness of 1.5 mm were purchased and subjected to mechanical working to be Al alloy pieces having necessary form. An aqueous solution containing degreaser for aluminum "NA-6" by 10.0% was made ready to be at 60° C. in a tank for immersion, in which the above aluminum alloy pieces were immersed for 5 minutes, and after then the pieces were rinsed with tap water. Next, an aqueous solution containing hydrochloric acid having a concentration of 1.0% was made ready to be at 40° C. in another tank, in which the Al alloy pieces were immersed for 1 minute, and after then the Al alloy pieces were rinsed with water. Next, an aqueous solution of caustic soda having a concentration of 1.5% was made ready to be at 40° C. in still another tank, in which the Al alloy pieces were immersed for 4 minutes, and after then the Al alloy pieces were rinsed with water. Next, an aqueous solution of nitric acid having a concentration of 3.0% was made ready to be at 40° C. in still another tank, in which the Al alloy pieces were immersed for 3 minutes, and after then the pieces were rinsed with water. Next, an aqueous solution of hydrazine hydrate having a concentration of 3.5% was made ready to be at 60° C. in another tank, in which the Al alloy pieces were immersed for 2 minutes, and then the alloy pieces were immersed in an aqueous solution of hydrazine hydrate having a concentration of 0.5% at 33° C. made ready in still another tank for 0.5 minute, and after then the pieces were rinsed with water. Next, after the Al alloy pieces were immersed in hydrogen peroxide water having a concentration of 1.5% made ready in another tank for 5 minutes, and the Al alloy pieces were rinsed well with water. These alloy pieces were placed in a warm air drier set to be at a temperature of 67° C. for 15 minutes to be dried there. After this, the Al alloy pieces were wrapped together with clean aluminum foil to be stored.

[Experiment Example 9] (Joined Article of CFRP with Al Alloy Sheet by Adhesion)

There are two kinds of adhesion methods, that is, a dry method and wet method, for adhesion method of a CFRP material with a metal sheet material, of which the latter is superior for reproducibility of adhesion strength. Specifically, this method comprises, in addition to a laminating step of CFRP prepregs, overlaying an Al alloy sheet painted with adhesive on the laminated prepregs, decompressing, compressing and heating the laminated, and joining the Al alloy sheet with the laminated prepregs by adhesion simultaneously at a time when the CFRP prepregs set to become CFRP. The CFRP prepregs are ones using plain weave type of cloth of CF, and in producing the joined article, one component epoxy adhesive "EW2040" made by Three M Japan Co. Ltd. (main company in Tokyo, Japan) was painted on one face of a sheet of Al alloy A6061 having a thickness of 0.5 mm having been subjected to NAT treatment (Experiment Example 8), and with such Al alloy sheet with the one component epoxy adhesive painted on, operation of adhesion of CFRP with an Al alloy sheet by the wet method was conducted. Thus, cutting it off to be divided, plurality of composites each comprising CFRP with an Al alloy sheet having a dimension of 45 mm×15 mm×3.5 mm were obtained (test pieces each having a form as shown in FIG. 1). As shear strength of adhesion between the main body of CFRP and the sheet of Al alloy A6061 joined thereto by adhesion was measured for this test piece, a measured value at a temperature of 23° C. was 38 to 39 MPa. In short, for shear strength of a pair joined by adhesion (test piece) consisting of two CFRP plates using new type of CF (having a tensile strength of about 6 GPa) or a pair joined by adhesion formed by the CFRP and a metal material having been subjected to NAT treatment, the highest value is about 40 MPa, even if there is some obstacle by difference of linear expansion.

In this, in a case where the composite of the present disclosure is to be used as a structural material for an aircraft, it is necessary to raise shear joining strength (or shear adhesion strength) between a CFRP material and a high strength metal material to a level of 60 MPa. What is used as a basic material on the CFRP material side is not a CFRP material alone, but a CFRP material with a sheet of high strength metal material having a thickness of 0.2 to 0.5 mm or so (for example, steel SUS304, Al alloy A6061 or Al alloy A2024) joined by adhesion in face to face. Another kind of metal plate material is joined to this CFRP with a metal sheet attached to by adhesion using one component epoxy adhesive, and thus formed article(s) is/are joined to a large scale main structural material. As the metal plate material(s) here is/are one(s) serving for joining with a main structural material through connection by bolt-nut, it/they may be a member (members) of a small dimension, even though may be of some thickness. That is, area of adhesion of the composite with a member to be joined may be at most 25 $cm^2$ (50 mm×50 mm). When a face for adhesion on the side of the composite is of an Al alloy A6061, shear strength of adhesion of the composite with the member serving for joining amounts to about 60 MPa (about 600 $kg/cm^2$), taking it as strength of adhesion between two metals, so that the force of adhesion becomes 600 $kg/cm^2$×25 $cm^2$=15t. Here, strength of adhesion by NAT of CFRP material with a sheet of Al alloy A6061 is 40 MPa as explained above, that is, about 10 t at most. However, face of adhesion of Al alloy A6061 with a main body of CFRP is far larger than 25 $cm^2$. Consequently, by preparing for face to face adhesion of the metal sheet with the main body of CFRP by a wide area as possible, it is possible to augment somewhat low strength of adhesion of CFRP material. Here, detailed explanation of this is provided in Patent Documents 10 and 12.

Further to say, there is an important condition also for the metal sheet to be joined by face to face adhesion to the CFRP material provided in Patent Document 10, 12, etc. This is one such that the above augmentation of low strength of adhesion is not effective with a metal having a low tensile strength or durability, so that the metal sheet to be joined with the main body of CFRP is torn off (simultaneous occurrence of peeling and tensile breaking) by joining adhesion force with the metal of a small dimension as a member to be joined, when furious, external shear force is loaded thereon. Specifically, when an Al alloy sheet is used as a metal sheet, a sheet of Al alloy A5052 having a thickness less than 0.8 to 1 mm will be torn off, which is considered to easily generate a problem (being too thick for a sheet), so that Al alloy A5082 or Al alloy A6061 having higher strength is suitable. Further, while test was also conducted for Al alloy A2024 having a sufficiently high strength and steel SUS304 having further higher strength, duralumin material having a thickness of 0.5 mm is not easily obtained as a stable and versatile material, and a thickness of 0.25 mm seems to be suitable for steel SUS304, which is difficult to obtain. From these circumstances, the present inventor took Al alloy A6061 having a thickness of 0.5 mm as the best metal sheet for joining by adhesion with CFRP to cover it.

With the present disclosure, adhesive for joining two kinds of materials having high strength by adhesion is not one component epoxy adhesive, but crystalline thermoplastic resin. The technique is of joining by injection molding. Therefore, as explained above, a face for joining by adhesion of a composite of CFRP material with Al alloy A6061 on the composite side is of Al alloy A6061, and surface treatment method necessary for the face is treatment method of d NMT 5 to 8, Ano-5 and Ano-7, which were presented in Prior Arts. Similarly, while surface treatment method to be conducted on the other metal material side is, in a case of a duralumin material such as Al alloy A7075 are treatment method of NMT 5 to 8, Ano-5, Ano-7, etc., treatment method for 64 Ti alloy, steel SUS304, etc. is SNMT treatment method.

[Experiment Example 10] (Joining Strength of SNMT of Al Alloy with Resin for Joining by Injection Molding)

In order to integrate an Al alloy sheet on one face of a CFRTP material, it is necessary at first to prepare a resin sheet with Al alloy sheet attached thereto as a mated member for joining by thermal fusion. Therefore, "CM3506G50" as a polyamide resin or PEEK resin was joined by injection molding onto an Al alloy A6061, and shear joining strength between the metal and resin was measured. In short, it is prerequisite that CFRTP is produced so as to comprise a PA66 as a typical polyamide resin or PEEK resin as matrix resin.

PEEK resin (dry blend resin comprising PEEK "90G" (made by Victrex plc: main company in Great Britain) by 95% and PEI "ULTEM9075" (made by SHPP Japan LLC: main company in Tokyo, Japan) by 5% was joined by injection molding onto Al alloy A6061, and shear joining strength between the metal and resin was measured. That is, it is prerequisite that CFRTP is produced so as to comprise PEEK resin as matrix resin. The result thereof is shown in Table 1. Shear joining strength in any thereof is according to ISO19095.

TABLE 1

Values of joining strength between metal and resin of joined article by injection moding of Al alloy A6061 with polyamide resin or PEEK resin

| Metal | Treating method | Resin to be injected | Shear joining strength |
|---|---|---|---|
| Al alloy A6061 | Experiment Example 2 | Polyamide resin(CM3506G50) | 53.3 Mpa |
| same as above | same as above | PEEK resin (PEEK + PEI) | 57.0 Mpa |

[Experiment Example 11] (Joining Strength of SNMT of High Strength Metal with Resin for Joining by Injection Molding)

Joining strength between a metal and resin in articles joined by injection molding was measured for composites of various high strength metal materials to be joined with CFRP or CFRTP with any of the following two kinds of resins for joining by injection molding. Results thereof is shown in Table 2. Each of measured values exhibits a joining strength higher than 50 MPa.

TABLE 2

Values of joining strength between metal and resin of joined article by injection molding of any of various high strength metals with polyamide resin or PEEK resin

| Metal | Treating method | Resin to be injected | Shear joining strength |
|---|---|---|---|
| Al alloy A7075 | Experiment Example 1 | Polyamide resin "CM3506G50" | 53.3 Mpa |
| 64 Ti alloy | Experiment Example 3 | same as above | 63.3 Mpa |
| Steel SUS304 | Experiment Example 5 | same as above | 54.9 Mpa |
| Steel SUS430 | Experiment Example 6 | same as above | 51.0 Mpa |
| SPCC | Experiment Example 7 | same as above | 47.5 Mpa |
| Al alloy A7075 | Experiment Example 1 | PEEK resin (PEEK + PEI) | 56.3 Mpa |
| 64 Ti alloy | Experiment Example 4 | same as above | 63.0 Mpa |

<Note>

PEEK resin used in the above is a same composition as one used in Table 1, i.e., dry blend resin comprising PEEK and PEI with a ratio of 95:5

In this, it has been found with "NMT" or "New NMT" as prior arts of joining by injection molding that shear joining strength is about 40 MPa when "SGX120" is used as resin to be injected. It is found that "SNMT" as an art of joining by injection molding used in the present disclosure usually provides performance higher than "NMT" or "New NMT", and also for composites joined by injection molding of various metal materials having been subjected to SNMT treatment with "SGX120", shear joining strength thereof is about 40 MPa.

What is claimed is:

1. A method for producing a composite of a CFRP material with a metal material, comprising:

a step of chemical treatment of an Al alloy sheet having a thickness of 0.3 to 0.8 mm by causing one surface of the Al alloy sheet to be subjected to chemical treatment for adhesion, a step of adhesion by joining the one surface of the Al alloy sheet to a surface of the CFRP material by adhesion to obtain the CFRP material with the Al alloy sheet attached to, a step of chemical treatment for joining by injection molding by causing a surface of the metal material and the other surface of the Al alloy sheet to be subjected to chemical treatment for joining by injection molding, a step of inserting by inserting the metal material and the CFRP material with the Al alloy sheet attached to into a metallic mold for injection molding so that the surface of the metal material and the other surface of the Al alloy sheet have a gap of 1.0 to 5.0 mm therebetween, a step of injection by injecting a high crystalline thermoplastic resin having heat resistance for joining by injection molding into the gap to form the composite of the CFRP material with the metal material.

2. The method for producing Raphe composite of the CFRP material with the metal material according to claim 1, wherein the step of adhesion includes:

a step of chemical treatment for adhesion, as a preliminary treatment, by conducting chemical treatment for joining by adhesive on one surface of the Al alloy sheet, a step of painting the one surface of the Al alloy sheet with one component epoxy adhesive, a step of laminating the Al alloy sheet with the CFRP material by overlaying the one surface of the Al alloy sheet on one surface of the CFRP material, and a step of adhesive setting by heating the laminated materials, in which the CFRP prepregs and the Al alloy sheet are laminated, in a circumstance decompressed below atmospheric pressure; and the step of chemical treatment for joining by injection molding includes conducting surface treatment so as to provide the surface of the metal material and the other surface of the Al alloy sheet with surface configuration, chemical reaction properties or surface physical properties suitable for joining by injection molding.

3. The method for producing the composite of the CFRP material with the metal material according to claim 1, wherein the Al alloy sheet material is of an Al alloy selected from A5052, A5083 and A6061 defined in Japan Industrial Standard.

4. The method for producing the composite of the CFRP material with the metal material according to claim 1, wherein the metal material is one selected from Al alloys A2014, A2017, A2024 and A7075 defined in Japan Industrial Standard or one selected from common steel, stainless steel and 64 Ti alloy.

5. The method for producing the composite of the CFRP material with the metal material according to claim 1, wherein the high crystalline thermoplastic resin is one selected from PPS resin, polyamide resin and PAEK resin including PEEK.

6. The method for producing the composite of the CFRP material with the metal material according to claim 5, wherein the PPS resin is one such that does not contain GF or contains GF by no more than 20 w %, the polyamide resin is one such that does not contain GF or contains GF by no more than 33.3 w %, and the PEEK or PAEK resin is one such that does not contain GF or a mixed resin with mass ratio of the PEEK to polyetherimide resin of 95:5 to 85:15.

7. The method for producing the composite of the CFRP material with the metal material according to claim 1, wherein the chemical treatment of the Al alloy sheet and the metal material is one such that water soluble amine compound is treated with triethanolamine or EDTA (4Na).

* * * * *